US010690801B2

(12) United States Patent
Pan et al.

(10) Patent No.: US 10,690,801 B2
(45) Date of Patent: Jun. 23, 2020

(54) SKIN EFFECT CORRECTION FOR FOCUSED ELECTRODE DEVICES BASED ON ANALYTICAL MODEL

(71) Applicant: Halliburton Energy Services, Inc., Houston, TX (US)

(72) Inventors: Li Pan, Singapore (SG); Yijing Fan, Singapore (SG); Rencheng Song, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 207 days.

(21) Appl. No.: 15/573,717

(22) PCT Filed: Jul. 10, 2015

(86) PCT No.: PCT/US2015/040047
§ 371 (c)(1),
(2) Date: Nov. 13, 2017

(87) PCT Pub. No.: WO2017/010978
PCT Pub. Date: Jan. 19, 2017

(65) Prior Publication Data
US 2018/0143343 A1 May 24, 2018

(51) Int. Cl.
*G01V 3/38* (2006.01)
*G01V 3/24* (2006.01)
(Continued)

(52) U.S. Cl.
CPC .............. *G01V 3/38* (2013.01); *G01V 1/50* (2013.01); *G01V 3/24* (2013.01); *G01V 11/002* (2013.01); *G01V 3/34* (2013.01)

(58) Field of Classification Search
CPC ... G01V 3/38; G01V 3/24; G01V 3/34; G01V 1/50
See application file for complete search history.

(56) References Cited

U.S. PATENT DOCUMENTS 3,609,518 A * 9/1971 Baker .................. G01V 1/48
324/323
4,471,307 A * 9/1984 Bravenec ............ G01V 3/20
324/373
(Continued)

FOREIGN PATENT DOCUMENTS

| WO | WO 2007/041516 A2 | 4/2007 |
| WO | WO 2011/123379 A1 | 10/2011 |
| WO | WO 2015/030807 A1 | 3/2015 |

OTHER PUBLICATIONS

Al Daghar et al., "Reservoir Characterization, Fracture Mapping, and Well Placement Using a Suite of Logging-While-Drilling Images with Multiple Resolutions in a Marginal, Middle East Carbonate Reservoir," SPE Reservoir Characterisation and Simulation Conference and Exhibition, Oct. 9-11, 2011, Abu Dhabi, UAE.
(Continued)

*Primary Examiner* — Michael J Dalbo
(74) *Attorney, Agent, or Firm* — Haynes and Boone, LLP

(57) ABSTRACT

Methods and systems for determining conductivity of a reservoir formation based on skin effect correction and an analytical model for admittance of the reservoir formation are presented in this disclosure. At least one analytical model of admittance of the formation can be initially built as a function of conductivity of the formation. A plurality of samples for the admittance of the formation can be generated, and one or more parameters of the at least one analytical model can be determined based on the plurality of samples and the at least one model. Then, admittance of the formation can be measured, and conductivity of the formation can be calculated from the measured admittance based on the analytical model with the parameters.

19 Claims, 8 Drawing Sheets

(51) Int. Cl.
*G01V 1/50* (2006.01)
*G01V 11/00* (2006.01)
*G01V 3/34* (2006.01)

(56) References Cited

U.S. PATENT DOCUMENTS

| | | |
|---|---|---|
| 5,698,982 A | 12/1997 | Mitchell |
| 5,703,773 A | 12/1997 | Tabarovsky et al. |
| 5,884,227 A | 3/1999 | Rabinovich et al. |
| 6,574,562 B2 | 6/2003 | Tabarovsky et al. |
| 7,010,429 B2 | 3/2006 | Xiao |
| 7,035,783 B2 | 4/2006 | Nagata et al. |
| 7,331,023 B2 | 2/2008 | Sercu et al. |
| 7,457,707 B2 | 11/2008 | Davydychev et al. |
| 8,620,636 B2 | 12/2013 | Zhan et al. |
| 8,731,877 B2 | 5/2014 | Okhmatovski et al. |
| 8,949,102 B2 | 2/2015 | Dai et al. |
| 2002/0193977 A1 | 12/2002 | Elco |
| 2004/0220741 A1* | 11/2004 | Haugland .......... G01V 3/30 702/7 |
| 2006/0095239 A1* | 5/2006 | Frenkel .......... G01V 1/40 703/5 |
| 2008/0183392 A1* | 7/2008 | Forgang .......... G01V 3/24 702/12 |
| 2009/0043555 A1 | 2/2009 | Busby et al. |
| 2010/0123461 A1 | 5/2010 | Folberth et al. |
| 2011/0161064 A1 | 6/2011 | Song et al. |
| 2011/0162849 A1 | 7/2011 | Soliman et al. |
| 2011/0257886 A1* | 10/2011 | Itskovich .......... G01V 3/28 702/7 |
| 2012/0143509 A1* | 6/2012 | G .......... G01V 3/28 702/7 |
| 2013/0032404 A1* | 2/2013 | Donderici .......... E21B 47/024 175/45 |
| 2013/0096833 A1* | 4/2013 | Hanna .......... G01V 3/24 702/11 |
| 2013/0110405 A1* | 5/2013 | Yang .......... G01N 33/49 702/19 |
| 2013/0282289 A1* | 10/2013 | Lotfy .......... E21B 47/00 702/7 |
| 2014/0032190 A1 | 1/2014 | Shlepnev |
| 2015/0032376 A1 | 1/2015 | Hou et al. |

OTHER PUBLICATIONS

Curran, "Loss Modeling in Non-Ideal Transmission Lines for Optimal Signal Integrity," *Technische Universität Berlin, Fakultät IV—Elektrotechnik and Informatik*, Doctoral Thesis.

Davies et al., "Azimuthal Resistivity Imaging: A New Generation Laterolog," Society of Petroleum Engineers, vol. No. 9, Issue No. 3, Sep. 1, 1994.

International Search Report and the Written Opinion of the International Search Authority, or the Declaration, dated Mar. 3, 2016, PCT/US2015/040047, 16 pages, ISA/KR.

Prammer et al., "Field Testing of an Advanced LWD Imaging Resistivity Tool," SPWLA 48$^{th}$ Annual Logging Symposium, Jun. 3-6, 2007, Austin, Texas USA.

Serry et al., "What is Rt? Logging-While-Drilling and Wireline Resistivity Measurements Spotlighted: An Offshore Case Study in Abu Dhabi," SPWLA 55$^{th}$ Annual Logging Symposium, May 18-22, 2014, Abu Dhabi, UAE.

Smits et al., High Resolution From a New Laterolog With Azimuthal Imaging. Society of Petroleum Engineers, SPE Annual Technical Conference and Exhibition, Oct. 22-25, 1995, Dallas, Texas, USA.

* cited by examiner

SKIN EFFECT CORRECTION FOR FOCUSED ELECTRODE DEVICES BASED ON ANALYTICAL MODEL

PRIORITY

The present application is a U.S. National Stage patent application of International Patent Application No. PCT/US2015/040047, filed on Jul. 10, 2015, the benefit of which is claimed and the disclosure of which is incorporated herein by reference in its entirety.

TECHNICAL FIELD

The present disclosure generally relates to evaluating electrical properties of a hydrocarbon bearing reservoir formation and, more particularly, to calculating conductivity of the formation with skin effect correction for a focused electrode device used as a logging tool based on an analytical model for admittance.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging, logging while drilling (LWD), drillpipe conveyed logging, and coil tubing conveyed logging.

An important component of the well logging suite is the measurement of electrical properties of a reservoir formation. Some of these measurements are related to the resistivity or conductivity of the formation, and can be obtained by using a focused electrode device as a logging tool. Electrical properties of the formation are useful for finding water-filled porosity, and water saturation can be computed if formation porosity is known. If multiple water saturation measurements are available (e.g., from different types of logging tools), it becomes possible to measure characteristics of the flushed zone. In order to evaluate formation resistivity or conductivity, the focused electrode devices may measure the admittance of formation, i.e., a ratio of a measured electrical current to an applied voltage. After that, an inversion scheme can be conducted to retrieve resistivity or conductivity from the measured admittance.

Skin effect is the tendency of an alternating electrical current (AC) to become distributed within a conductor (e.g., the focused electrode device used as a logging tool), such that the electrical current density is largest near the surface of the conductor and decreases with greater depths in the conductor. Therefore, the electrical current flows mainly at the "skin" or surface of the conductor, between the outer surface and a level called the skin depth. Because of the skin effect, the relation between the conductivity (or resistivity) and admittance can be a complicated nonlinear function, especially for high conductivity region and deep measurements.

Since an accurate analytical model for the skin effect is not available, the conventional inversion method usually involves building a large database of admittance values for different formation depths and then performing interpolation or extrapolation to obtain conductivity/resistivity of the formation. However, this method has several flaws: very dense sampling is required to enhance the accuracy of the conventional inversion method, especially for the nonlinear region (i.e., high conductivity and deep measurements); the dense sampling not only increases the cost of building the database, but also degrades the efficiency of inversion. Furthermore, certain error is introduced to the inversion as a consequence of interpolation and extrapolation, since such inversion method, either being linear, Lagrange or spline, is not based on physics.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
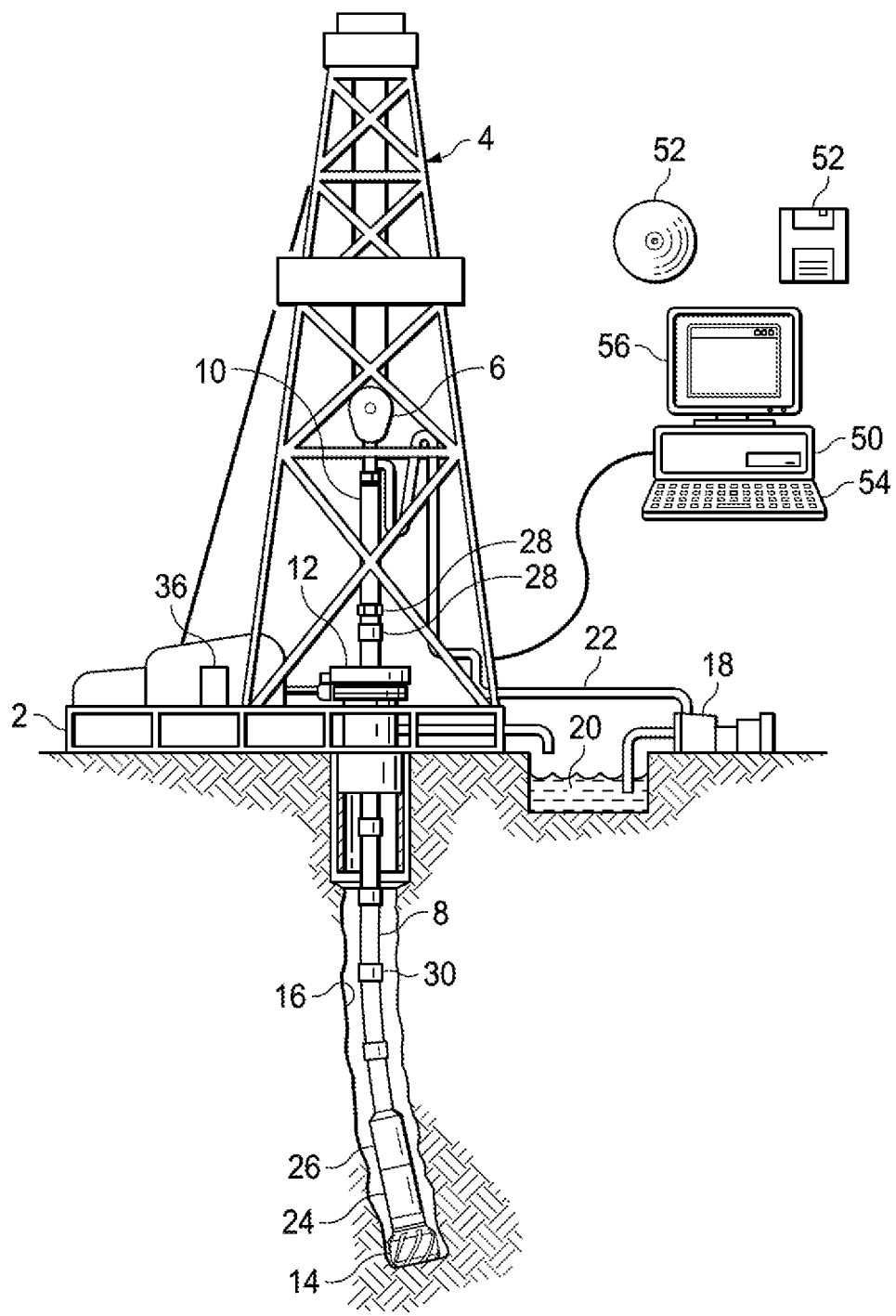
FIG. 1 is a schematic diagram showing a cross-sectional view of an illustrative logging while drilling (LWD) environment in which a logging tool is deployed, according to certain illustrative embodiments of the present disclosure.

Embodiments of the present disclosure relate to building an accurate analytical model for the admittance of a hydrocarbon bearing reservoir formation that includes skin effect of a measuring device or a logging tool (e.g., a focused electrode device), and conducting the inversion scheme based on the analytical model to obtain conductivity/resistivity of the reservoir formation. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It would also be apparent to one skilled in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Illustrative embodiments and related methods of the present disclosure are described below in reference to FIGS. 1-8 as they might be employed, for example, in a system for calculating electrical properties of a hydrocarbon bearing reservoir formation. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

The present disclosure establishes methods to perform evaluation of electrical properties of a hydrocarbon bearing reservoir formation that may be implemented in various downhole operation tools such as Logging While Drilling (LWD) tools and Measurement While Drilling (MWD) tools. The methods presented in this disclosure also can be extended to other drilling equipment, wireline tools, production tools and other systems and equipment utilized in hydrocarbon drilling and production. In an embodiment of the present disclosure, the methods and apparatus presented herein may be applied in relation to focused electrode devices that can be utilized for downhole oil and gas applications such as logging while drilling operation and measurement while drilling operation.

FIG. 1 shows an illustrative logging-while-drilling (LWD) environment in which a logging tool is deployed. In one or more embodiments, the LWD logging tool may be a focused electrode device. A drilling platform 2 supports a derrick 4 having a traveling block 6 for raising and lowering a drill string 8. A top drive 10 supports and rotates drill string 8 as it is lowered through wellhead 12. A drill bit 14 is driven by a downhole motor and/or rotation of drill string 8. As bit 14 rotates, it creates a borehole 16 that passes through various formations. A pump 18 circulates drilling fluid 20 through a feed pipe 22, through the interior of drill string 8 to drill bit 14. The fluid exits through orifices in drill bit 14 and flows upward through the annulus around drill string 8 to transport drill cuttings to the surface, where the fluid is filtered and recirculated.

Drill bit 14 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

An LWD logging tool 24 is integrated into the bottom-hole assembly near bit 14. In this illustrative embodiment, logging tool 24 may be, for example, any of focused electrode devices illustrated in FIG. 3. As bit 14 extends the borehole through the formations, logging tool 24 rotates and collects azimuthally-dependent reflection measurements that a downhole controller associates with tool position and orientation measurements. The measurements can be stored in internal memory and/or communicated to the surface. A telemetry sub 26 may be included in the bottom-hole assembly to maintain a communications link with the surface. Mud pulse telemetry is one common telemetry technique for transferring tool measurements to surface receivers and receiving commands from the surface, but other telemetry techniques can also be used.

At the surface, a data acquisition module 36 receives the uplink signal from the telemetry sub 26. Module 36 optionally provides some preliminary processing and digitizes the signal. A data processing system 50 (shown in FIG. 1 as a computer) receives a digital telemetry signal, demodulates the signal, and displays the tool data or well logs to a user. Software (represented in FIG. 1 as information storage media 52) governs the operation of system 50. A user interacts with system 50 and its software 52 via one or more input devices 54 and one or more output devices 56.

Figure 2:
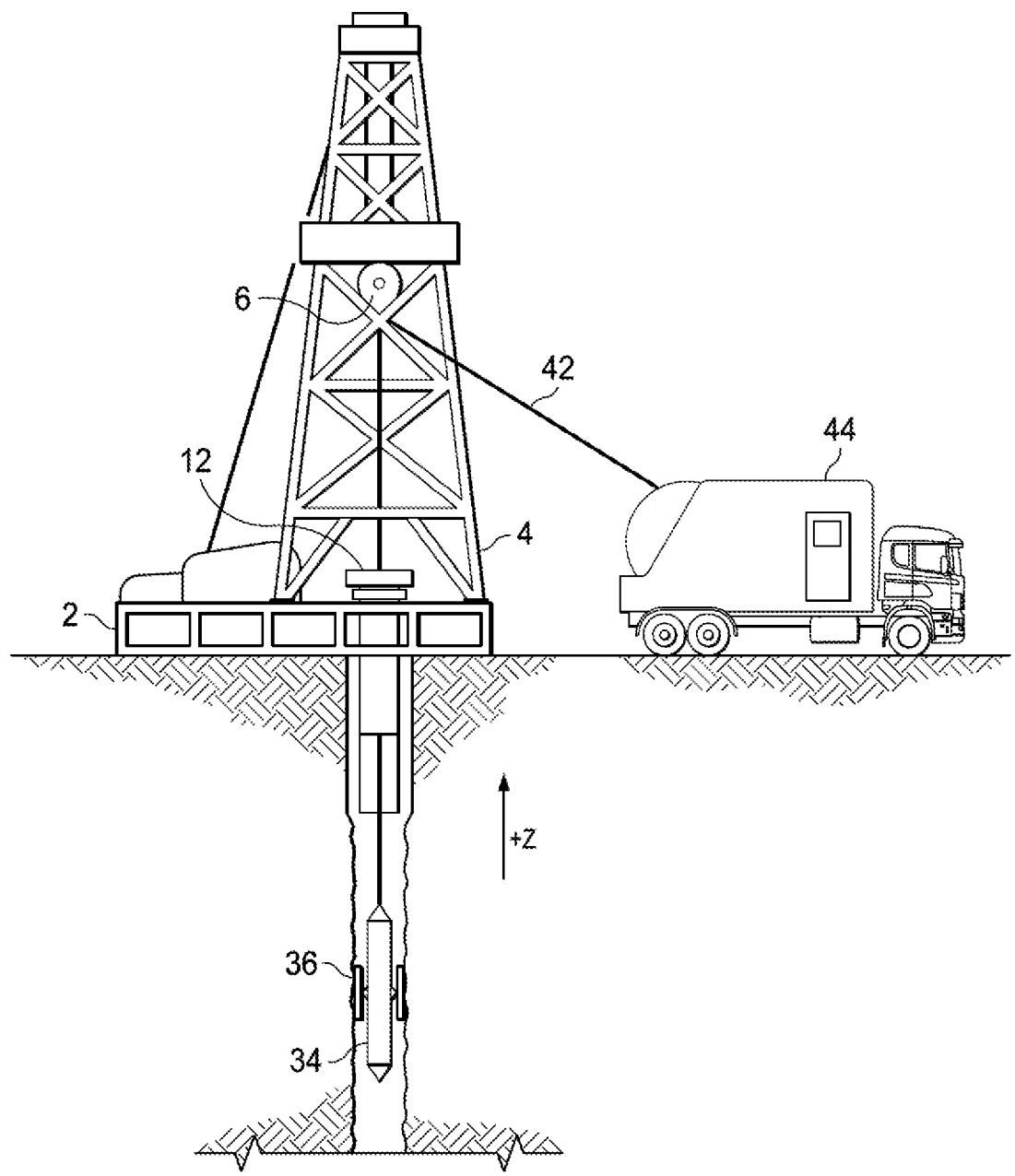
FIG. 2 is a schematic diagram showing a cross-sectional view of an embodiment of the present disclosure deployed in a wireline application.

At various times during the drilling process, drill string 8 may be removed from the borehole as indicated in FIG. 2, which shows an embodiment of the present disclosure deployed in a wireline application. In such an embodiment, once drill string 8 has been removed, logging operations can be conducted using a wireline logging tool 34, i.e., a sensing instrument sonde suspended by a cable 42 having conductors for transporting power to the tool and telemetry from the tool to the surface. In this example, a dielectric logging portion of the logging tool 34 may have sensing pads 36, having one or more electromagnetic sensors positioned thereon, that slide along the borehole wall as the tool is pulled uphole. A logging facility 44 collects measurements from logging tool 34, and includes computing facilities for processing and storing the measurements gathered by logging tool 34.

Figure 3:
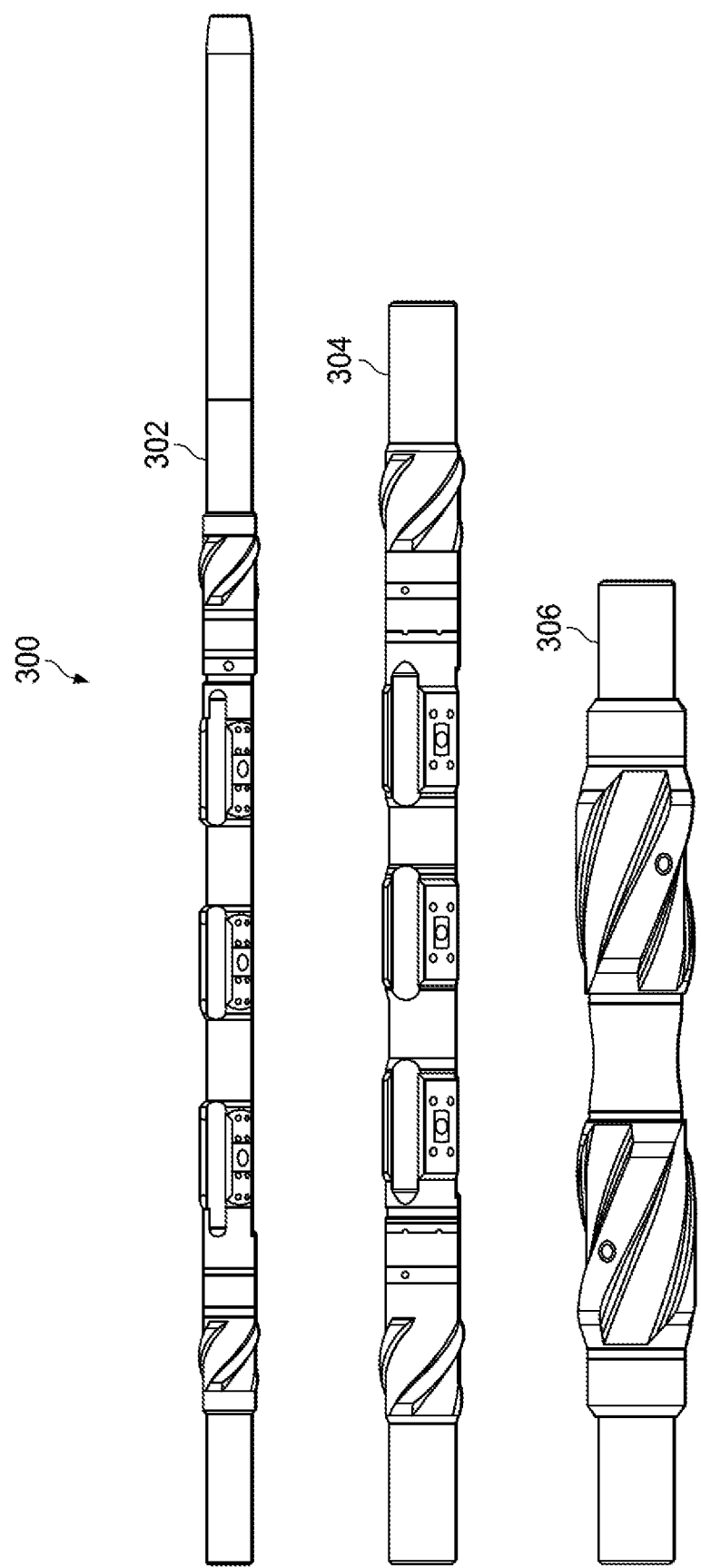
FIG. 3 is a two-dimensional view of focused electrode devices used as a logging tool, according to certain illustrative embodiments of the present disclosure.

The illustrative method and apparatus presented in this disclosure may relate to the logging tool 24 of the LWD environment illustrated in FIG. 1 and/or the logging tool 34 of the wireline application illustrated in FIG. 2. In one or more illustrative embodiments, the logging tool may be based on the focused electrode device. Examples of the focused electrode devices are azimuthal focused resistivity (AFR) tools 300 illustrated in FIG. 3 having different tool diameters. FIG. 3 illustrates the series of AFR tools 302, 304, 306 with different tool diameters (e.g., diameters of 4¾ inch, 6¾ inch and 8 inch, respectively) so as to suit different boreholes. In one or more embodiments, the AFR tools from FIG. 3 can be applied for measuring admittance of a reservoir formation for different formation depths. The measured admittance values can be then used to obtain conductivity/resistivity of the formation. For accurate calculation of conductivity/resistivity of the formation, the skin effect that occurs in the focused electrode devices (e.g., the AFR tools from FIG. 3) needs to be taken into account. Embodiments of the present disclosure relate to accurate and efficient skin effect correction for the focused electrode devices.

Due to the absence of an accurate analytical model for the skin effect of logging tools such as focused electrode devices, the conventional ways for correcting the skin effect usually involve the use of a large database of admittance values and various techniques of interpolation and extrapolation for obtaining resistivity/conductivity of a reservoir formation. Consequently, very dense sampling is required in order to enhance the accuracy, especially for the nonlinear region (i.e., high conductivity and deep measurements). Unfortunately, dense sampling not only increases the cost of measurement and simulation for building the database, but also degrades the efficiency of the inversion. In addition, certain error is introduced to the inversion by interpolation and extrapolation, since these conventional interpolation and extrapolation methods (e.g., linear, Lagrange, spline, and the like) are not based on physics.

To remedy all these flaws of the conventional approaches for obtaining conductivity/resistivity of a hydrocarbon bearing reservoir formation, illustrative methods to build accurate physics-based analytical models of skin effect are presented in this disclosure. Parameters of the analytical models presented herein can be readily determined from only a few samples of admittance. Therefore, the methods presented in this disclosure eliminate the cost of building a large database of admittance values for different formation depths.

In one or more embodiments, an inversion method based on the analytical model presented herein may be performed to obtain conductivity/resistivity values for different depths of the reservoir formation. The inversion methods presented in this disclosure prevent the error due to interpolation and extrapolation. Furthermore, the inversion methods of the present disclosure are fast and can generate results in real time, and can be readily integrated into a firmware or a data system.

From the theory of electrodynamics, the AC electrical current due to an electromagnetic (EM) wave can be expressed as:

$$J = J_0 e^{-\omega z \sqrt{\frac{1}{2}\mu\varepsilon\left(\sqrt{1+\frac{\sigma^2}{\varepsilon^2\omega^2}}-1\right)}} \cos\left(\omega \cdot z \sqrt{\frac{1}{2}\mu\varepsilon\left(\sqrt{1+\frac{\sigma^2}{\varepsilon^2\omega^2}}+1\right)} - \omega \cdot t\right), \quad (1)$$

where J is an electrical current density in units of A/m² (Ampere per square meter); $J_0$ is a density of the AC electrical current at a surface of a conductive medium (e.g., a focused electrode device); $\omega$ is an angular frequency in units of Rad/s (i.e., $\omega=2\pi f$, wherein f is a frequency in Hz); $\mu$ is a permeability in units of H/m (Henry per meter); $\varepsilon$ is a permittivity in units of F/m (Farad per meter); $\sigma$ is a conductivity in units of S/m (Siemens per meter); and z is a depth (in meters) from the surface of conductive medium.

Considering the physics of skin effect (i.e., the density of AC electrical current as a function of the depth from the surface of conductive medium given by equation (1)), and appealing to the low frequency approximation, a model of admittance Y as a function of conductivity $\sigma$ for focused electrode devices (e.g., the AFR tools illustrated in FIG. 1) is presented herein. In one such method, the model for the magnitude of admittance is defined by equation (2), and the model for the real part of admittance (i.e., conductance) is defined by equation (3):

$$|Y| = A\sigma e^{-B\sqrt[4]{\sigma}}, \quad (2)$$

$$Re(Y) = A\sigma e^{-B\sqrt[4]{\sigma}} \cos(-B\sqrt[4]{\sigma}), \quad (3)$$

where Y is an admittance in units of S (Siemens) or mS (milli Siemens); |Y| is a magnitude of the admittance; G=Re(Y) is a conductance, i.e., a real part of a complex value of the admittance; A, B and S are auxiliary parameters in the admittance models defined by equations (2)-(3). Thus, each of the admittance models defined by equations (2)-(3) is of a form similar to the low frequency approximation of the electromagnetic (EM) plane wave case. However, since the skin effect associated with the focused electrode devices is not exactly a plane wave problem, the three auxiliary parameters A, B, and S need to be determined from measurements (e.g., conducted by the focused electrode devices).

In one or more embodiments, several samplings of admittance obtained by measurement or simulation are used to determine the three auxiliary parameters A, B, and S in the models given by equations (2)-(3). For example, the following sampling scheme can be applied. In the linear conductivity region (e.g., 0 S/m≤$\sigma$≤100 S/m), at least one sampling of admittance may be taken. In the nonlinear region (e.g., 100 S/m≤$\sigma$), at least three sampling points of admittance may be taken: the first sampling of admittance may be taken at a very high conductivity, for example at $\sigma$=10000 S/m; the second sampling of admittance may be taken at a low conductivity, for example at $\sigma$=1000 S/m; one or more samples of admittance may be taken for 1000 S/m≤$\sigma$≤10000 S/m.

At each sampling point, a voltage $V_{apply}$ is applied and the resulting electrical current $I_{actual}$ is obtained by measurement conducted by a focused electrode device or by performing simulation (e.g., compatible with properties of focused electrode devices). By taking the ratio of the measured or simulated electrical current ($I_{actual}$) to the applied voltage ($V_{apply}$), the admittance $Y_{actual}=I_{actual}/V_{apply}$ is calculated.

In one or more embodiments, the three auxiliary parameters A, B, and S may be determined by minimizing an error function, as defined in equation (4) and equation (5), where $|Y_{model}|$ and $\text{Re}[Y_{model}]$ are calculated using admittance models defined by equation (2) and equation (3), respectively, i.e., $$(A,B,S)=\text{argmin}(|Y_{actual}|-|Y_{model}|)^2, \quad (4)$$

$$(A,B,S)=\text{argmin}(\text{Re}[Y_{actual}]-\text{Re}[Y_{model}])^2. \quad (5)$$

For example, the model parameters A, B, and S may be extracted from the measured admittance for the deep measurement using the AFR tool 304 illustrated in FIG. 3 with 6¾-inch tool diameter and 8.14-inch button blade diameter. Then, the model for magnitude of admittance defined by equation (2) may become $$|Y|=1.15\cdot 10^{-6}\sigma\cdot e^{-0.007509\cdot 1.804\sqrt{\sigma}}, \quad (6)$$

and the model for real part of admittance (i.e., conductance) defined by equation (3) may become $$\text{Re}(Y) = 1.006\cdot 10^{-6}\sigma\cdot e^{-0.00136\cdot \sqrt[1.315]{\sigma}} \cos(-0.00136\cdot \sqrt[1.315]{\sigma}). \quad (7)$$

Figure 4A:
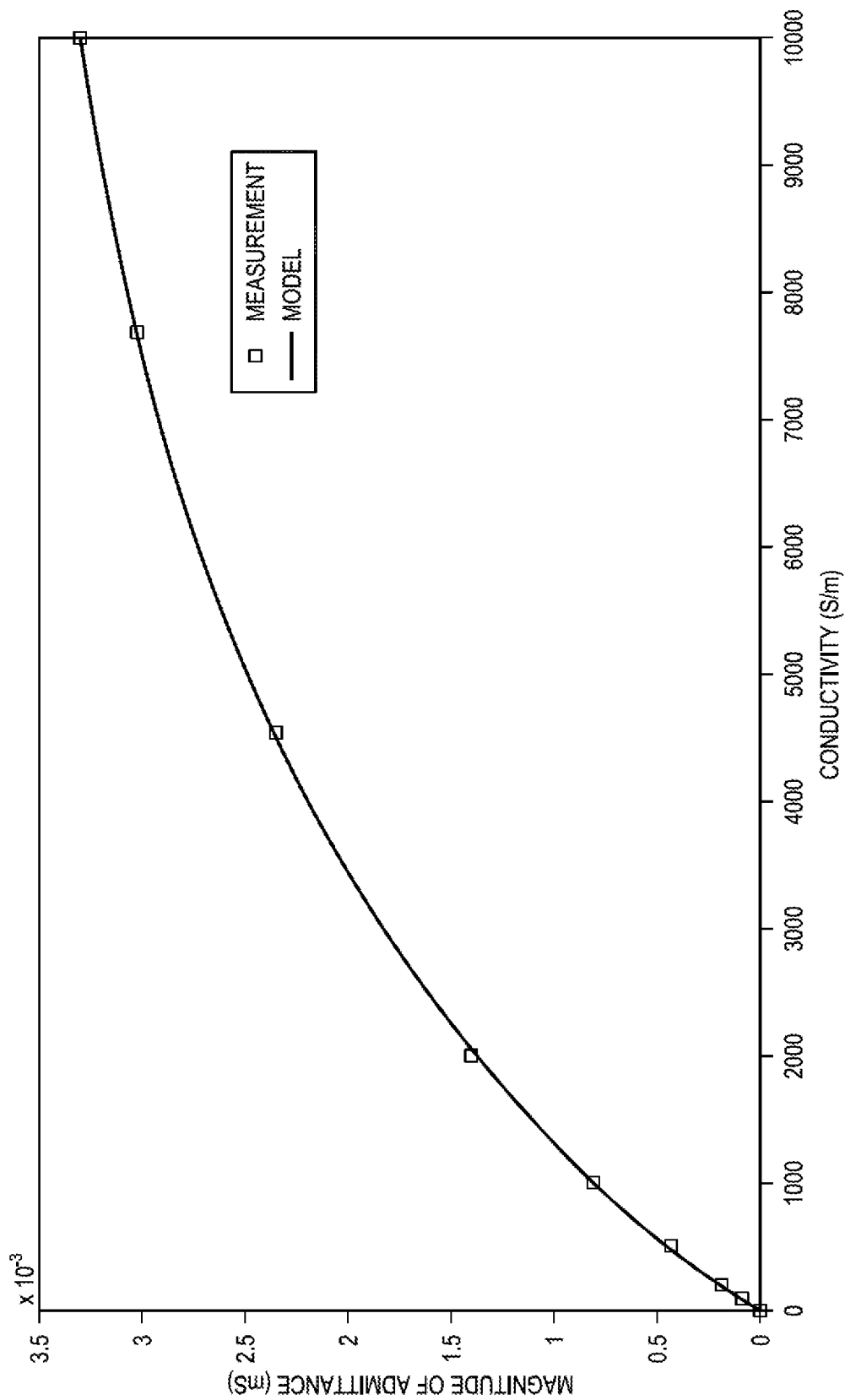
FIG. 4A is a graph illustrating modeling a magnitude of admittance as a function of conductivity, according to certain embodiments of the present disclosure.
Figure 4B:
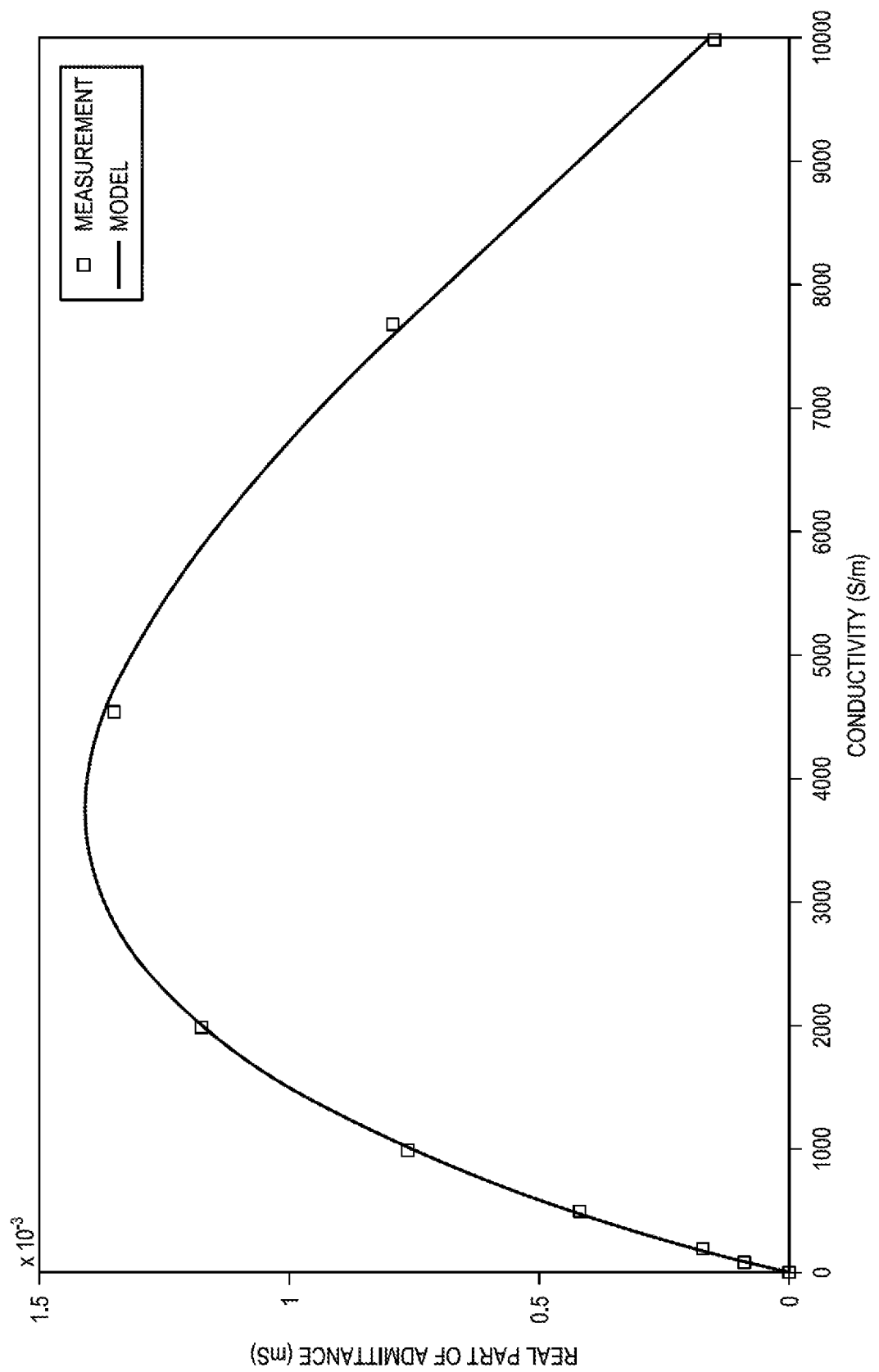
FIG. 4B is a graph illustrating modeling a real part of admittance as a function of conductivity, according to certain embodiments of the present disclosure.

The agreement between values of measured admittance (e.g., obtained by the AFR tool based on a measured electrical current for an applied voltage for a specific formation depth) and values of admittance obtained by the models given by equations (6)-(7) is shown in FIGS. 4A-4B.

In one or more embodiments, the inversion scheme for obtaining conductivity from admittance may be based on the analytical model, i.e., conductivity can be readily obtained by solving equation (2) or equation (3) for conductivity σ based on known (measured) admittance Y using various numerical techniques. For example, one efficient numerical technique for solving equations (2) and (3) for conductivity σ is a technique based on the bisection algorithm.

Figure 5:
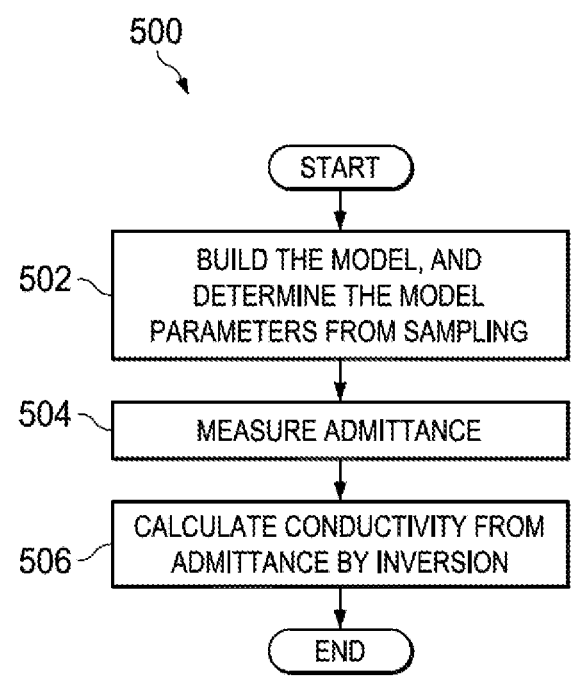
FIG. 5 is a workflow for modeling and inversion, according to certain embodiments of the present disclosure.

FIG. 5 illustrates a workflow 500 for modeling and inversion, according to certain embodiments of the present disclosure. At a block 502, an analytical model for admittance as a function of conductivity are built (e.g., the model for magnitude of admittance defined by equation (2) or the model for real part of admittance defined by equation (3)), and model parameters (e.g., the three auxiliary parameters A, B, and S from the models defined by equations (2)-(3)) are determined from sampling values of the admittance. At a block 504, values of the admittance are measured (e.g., using the focused electrode devices) for different depths of a reservoir formation. At a block 506, values of the conductivity for different depths of the reservoir formation are calculated from the measured values of admittance by applying an inversion scheme on the analytical model for admittance with the determined model parameters (e.g., by solving equation (6) or equation (7) for conductivity σ given the measured values of admittance Y).

The inversion scheme utilized in block 506 may be a numerical technique for solving a nonlinear equation with one unknown variable (i.e., conductivity σ when admittance Y is known variable). For a specific depth of the reservoir formation, the value of admittance Y can be obtained by a logging tool (e.g., the AFR tool illustrated in FIG. 3) based on a measured electrical current for an applied voltage for that specific formation depth. Then, the numerical technique can be applied to calculate the value of conductivity σ for the specific depth of the reservoir formation that solves equation (6) or equation (7) using the previously obtained value of admittance Y. In certain embodiment, the numerical technique may be based on the bisection numerical technique.

Figure 6:
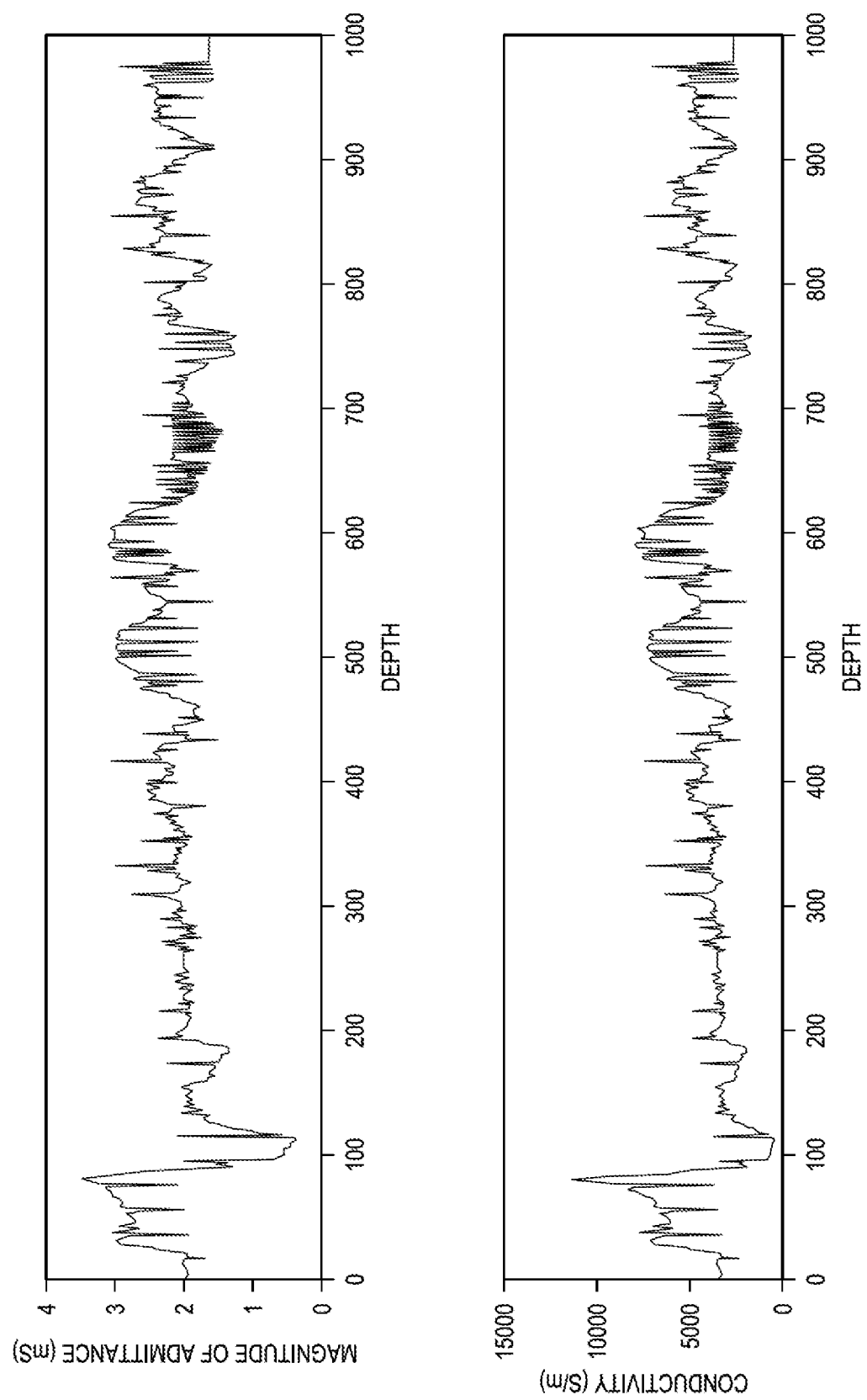
FIG. 6 is example graphs of admittance and conductivity as a function of formation depth showing implementation of the workflow from FIG. 5, according to certain embodiments of the present disclosure.

In one or more embodiments, the workflow 500 of FIG. 5 can be readily integrated into a firmware or a data system. The workflow 500 has been tested using real logging data, and results for magnitude of admittance and conductivity as a function of reservoir formation depth are shown in FIG. 6. According to the example test, the result at each logging sample can be obtained in less than 0.008 sec using Intel® Core™ i7-2620M CPU running at 2.70 GHz interfaced with 8 GB RAM. Hence, the workflow 500 for modeling and inversion presented herein and illustrated in FIG. 5 fulfills the real-time operation requirement that the result for each logging sample should be generated in less than 0.02 sec.

Figure 7:
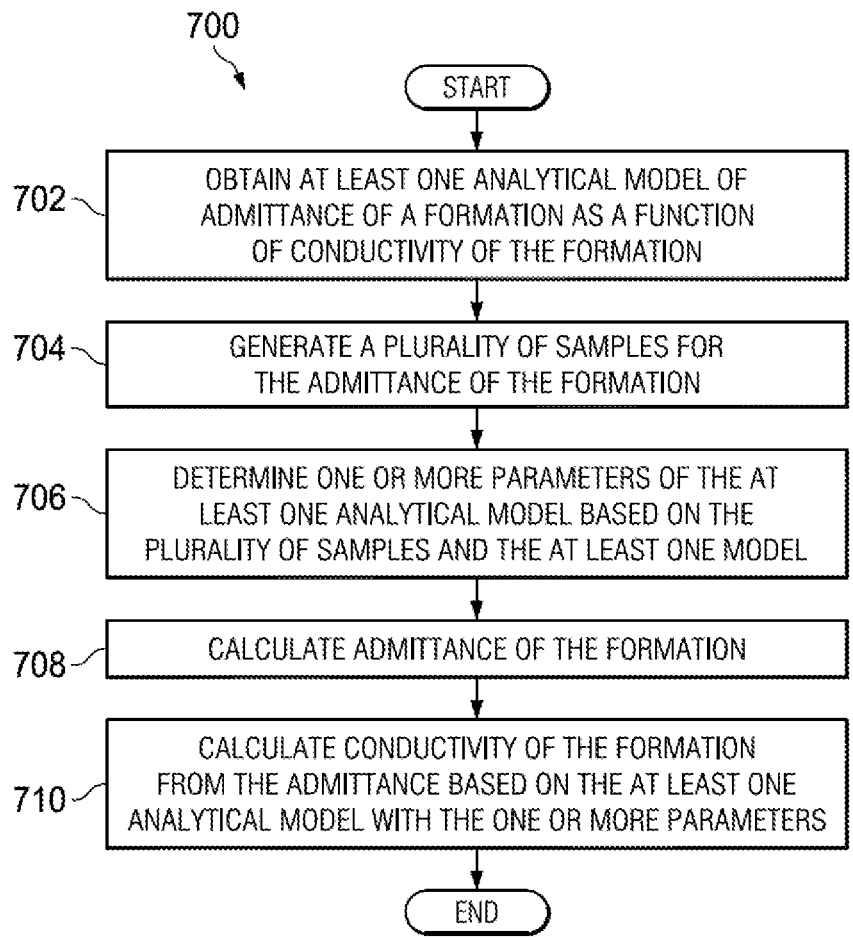
FIG. 7 is a flow chart illustration of a method for evaluating formation conductivity, according to certain embodiments of the present disclosure.

Discussion of an illustrative method of the present disclosure will now be made with reference to FIG. 7, which is a flow chart 700 of a method for evaluating conductivity of a hydrocarbon bearing reservoir formation, according to certain embodiments of the present disclosure. The method begins at block 702 by obtaining at least one analytical model (e.g., the model defined by equation (2) and/or the model defined by equation (3)) of admittance of the formation as a function of conductivity of the formation, as described herein. At block 704, a plurality of samples for the admittance of the formation may be generated (e.g., by measurement performed by focused electrode devices or by performing simulation). At block 706, one or more parameters (the auxiliary parameters A, B, and S from the models defined by equations (2)-(3)) of the at least one analytical model may be determined based on the plurality of samples and the at least one model. At block 708, values of admittance for different depths of the formation may be calculated (e.g., by measuring, for a depth of the formation, an electrical current for an applied voltage using the focused electrode device). At block 710, conductivity of the formation (conductivity values for different depths of the formation) may be calculated from the measured admittance based on the at least one analytical model with the one or more parameters (e.g., using the inversion scheme on the model given by equation (6) or the inversion scheme on the model given by equation (7)). In one or more embodiments, a downhole operation may then be performed (e.g., by a downhole tool) based on the calculated conductivity of the formation.

Figure 8:
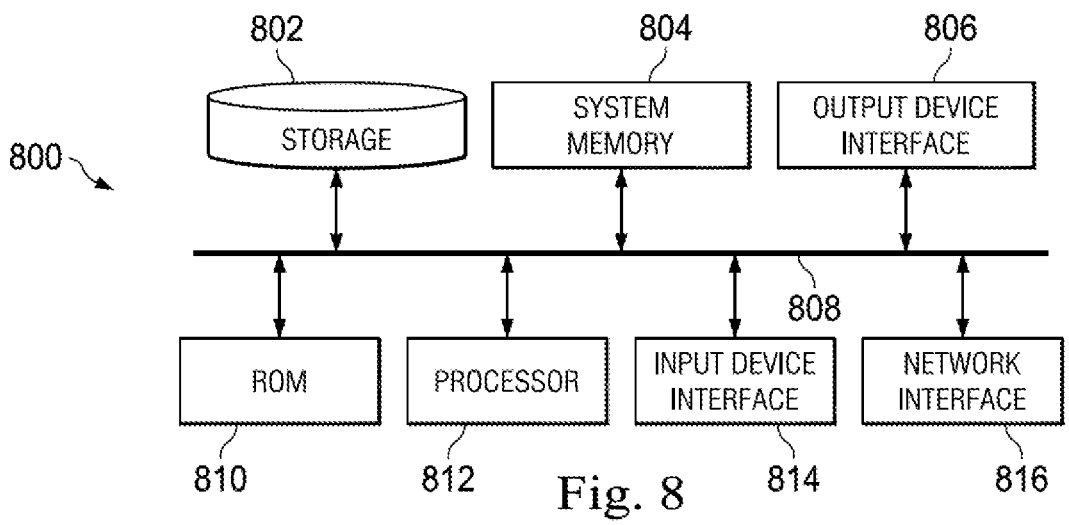
FIG. 8 is a block diagram of an illustrative computer system in which embodiments of the present disclosure may be implemented.

FIG. 8 is a block diagram of an illustrative computer system 800 in which embodiments of the present disclosure may be implemented adapted for determining conductivity of a reservoir formation. For example, the method of workflow 500 from FIG. 5 and the operations of method 700 of FIG. 7, as described above, may be implemented using system 800. System 800 can be a computer (e.g., computer 50 of the LWD environment illustrated in FIG. 1), phone, personal digital assistant (PDA), or any other type of electronic device. Such an electronic device includes various types of computer readable media and interfaces for various other types of computer readable media. As shown in FIG. 8, system 800 includes a permanent storage device 802, a system memory 804, an output device interface 806, a system communications bus 808, a read-only memory (ROM) 810, processing unit(s) 812, an input device interface 814, and a network interface 816.

Bus 808 collectively represents all system, peripheral, and chipset buses that communicatively connect the numerous internal devices of system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of system 800. Permanent storage device 802, on the other hand, is a read-and-write memory device. This device is a non-volatile memory unit that stores instructions and data even when system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for performing operations described in the present disclosure. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to system 800. Input devices used with input device interface 814 include, for example, alphanumeric, QWERTY, or T9 keyboards, microphones, and pointing devices (also called "cursor control devices"). Output device interfaces 806 enables, for example, the display of images generated by system 800. Output devices used with output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 8, bus 808 also couples system 800 to a public or private network (not shown) or combination of networks through a network interface 816. Such a network may include, for example, a local area network (LAN), such as an Intranet, or a wide area network (WAN), such as the Internet. Any or all components of system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the method of workflow 500 from FIG. 5 and the operations of method 700 of FIG. 7, as described above, may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations in the processes disclosed is an illustration of exemplary approaches. Based upon design preferences, it is understood that the specific order or hierarchy of operations in the processes may be rearranged, or that all illustrated operations be performed. Some of the operations may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the illustrative methods described herein may be implemented by a system including processing circuitry or a computer program product including instructions which, when executed by at least one processor, causes the processor to perform any of the methods described herein.

A method for evaluating formation conductivity has been described and may generally include: obtaining at least one analytical model of admittance of a formation as a function of conductivity of the formation; generating a plurality of samples for the admittance of the formation; determining one or more parameters of the at least one analytical model based on the plurality of samples and the at least one model; calculating admittance of the formation; and calculating conductivity of the formation from the admittance based on the at least one analytical model with the one or more parameters.

For the foregoing embodiments, the method may include any one of the following operations, alone or in combination with each other: Generating the plurality of samples for the admittance comprises obtaining sample measurements of the admittance; Obtaining the sample measurements of the admittance comprises obtaining at least one of the sample measurements in a linear region of the conductivity, and obtaining at least three of the sample measurements in a nonlinear region of the conductivity; Generating the plurality of samples for the admittance comprises obtaining the plurality of samples by simulation; Generating the plurality of samples for the admittance comprises applying a voltage for each sample, obtaining, for each sample, a resulting electrical current for the applied voltage by measurement or simulation, and calculating that sample as a ratio of the resulting electrical current and the applied voltage; Determining the one or more parameters comprises minimizing an error between the plurality of samples for the admittance and values of the admittance based on the at least one analytical model; Calculating admittance of the formation comprises measuring, for a depth of the formation, an electrical current resulting from an applied voltage, and calculating a admittance value for the depth as a ratio of the measured electrical current and the applied voltage; Calculating conductivity of the formation comprises calculating a conductivity value for the depth of the formation by applying an inversion scheme on the at least one analytical model that includes the one or more parameters and the admittance value; Performing a downhole operation based on the calculated conductivity of the formation;

The at least one analytical model of admittance comprises at least one of: a model for magnitude of admittance, or another model for a real part of admittance; The inversion scheme comprises the bisection algorithm.

Likewise, a system for evaluating formation conductivity has been described and includes at least one processor coupled to at least one focused electrode device, wherein: the at least one processor is configured to obtain at least one analytical model of admittance of a formation as a function of conductivity of the formation; the at least one focused electrode device is configured to generate a plurality of samples for the admittance of the formation; the at least one processor is further configured to determine one or more parameters of the at least one analytical model based on the plurality of samples and the at least one model; the at least one focused electrode device is further configured to measure admittance of the formation; and the at least one processor is further configured to calculate conductivity of the formation from the measured admittance based on the at least one analytical model with the one or more parameters;

For any of the foregoing embodiments, the system may include any one of the following elements, alone or in combination with each other: the at least one focused electrode device further configured to measure the plurality of samples for the admittance of the formation for different conductivity values of the formation; the at least one focused electrode device further configured to measure at least one of the samples in a linear region of the conductivity, and measure at least three of the samples in a nonlinear region of the conductivity; the at least one focused electrode device further configured to, for each sample of the plurality of samples, apply a voltage and measure a resulting electrical current for the applied voltage, and the at least one processor further configured to calculate that sample as a ratio of the resulting electrical current and the applied voltage; the at least one processor further configured to minimize an error between the plurality of samples for the admittance and values of the admittance based on the at least one analytical model to determine the one or more parameters; the at least one focused electrode device further configured to measure, for a depth of the formation, an electrical current resulting from an applied voltage, and the at least one processor further configured to calculate a admittance value for the depth as a ratio of the measured electrical current and the applied voltage; the at least one processor further configured to calculate a conductivity value for the depth of the formation by applying an inversion scheme on the at least one analytical model that includes the one or more parameters and the admittance value, wherein the inversion scheme comprises the bisection algorithm; a downhole tool interfaced with the at least one processor and the at least one focused electrode device, the downhole tool is configured to perform a downhole operation based on the calculated conductivity of the formation; the at least one focused electrode device comprises at least one azimuthal focused resistivity (AFR) tool configured for measuring admittance values for different depths of the formation.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

As described above, embodiments of the present disclosure are particularly useful for determining conductivity/resistivity of a reservoir formation based on the analytical model for admittance that takes into account the skin effect of LWD/MWD tool (e.g., the focused electrode device such as the AFR devices illustrated in FIG. 3). The conventional methods for determining conductivity of the reservoir formation use a large database (e.g., based on lookup tables). In contrast, the illustrative methods presented in this disclosure build analytical models based on physics. Further, the conventional method performs inversion by interpolation and extrapolation. In contrast, the methods presented in this disclosure perform inversion by solving equations, i.e., solving physics-based analytical models.

Advantages of the present disclosure include, but are not limited to, cost reduction, improved accuracy, enhanced efficiency, and easy integration. The methods presented in this disclosure eliminate the cost of measurement and simulation for building a large database and developing the software for utilizing the database; instead, the database is replaced herein by equations, i.e., the analytical models. The methods presented in this disclosure provide higher accuracy, because the analytical models presented herein is based on physics and avoids the error introduced by conventional way of interpolation and extrapolation. The inversion algorithms presented herein are fast and results can be generated in real time, since the inversion is based on solving the analytical model. As discussed, the methods presented in this disclosure can be readily integrated into a firmware or a data system.

Additionally, the flowcharts and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

What is claimed is:

1. A method for evaluating formation conductivity, the method comprising:
    obtaining at least one analytical model of admittance of a formation as a function of conductivity of the formation;
    generating a plurality of samples for the admittance of the formation;
    determining one or more parameters of the at least one analytical model based on the plurality of samples and the at least one model;
    calculating admittance of the formation;
    calculating conductivity of the formation from the admittance based on the at least one analytical model with the one or more parameters; and
    performing a downhole operation based on the calculated conductivity of the formation.

2. The method of claim 1, wherein the at least one analytical model of admittance comprises at least one of: a model for magnitude of admittance, or another model for a real part of admittance.

3. The method of claim 1, wherein generating the plurality of samples for the admittance comprises obtaining sample measurements of the admittance.

4. The method of claim 3, wherein obtaining the sample measurements of the admittance comprises:
    obtaining at least one of the sample measurements in a linear region of the conductivity; and
    obtaining at least three of the sample measurements in a nonlinear region of the conductivity.

5. The method of claim 1, wherein generating the plurality of samples for the admittance comprises obtaining the plurality of samples by simulation.

6. The method of claim 1, wherein generating the plurality of samples for the admittance comprises:
    applying a voltage for each sample;
    obtaining, for each sample, a resulting electrical current for the applied voltage by measurement or simulation; and
    calculating that sample as a ratio of the resulting electrical current and the applied voltage.

7. The method of claim 1, wherein determining the one or more parameters comprises:
    minimizing an error between the plurality of samples for the admittance and values of the admittance based on the at least one analytical model.

8. The method of claim 1, wherein calculating admittance of the formation comprises:
    measuring, for a depth of the formation, an electrical current resulting from an applied voltage; and
    calculating a admittance value for the depth as a ratio of the measured electrical current and the applied voltage.

9. The method of claim 8, wherein calculating conductivity of the formation comprises:
    calculating a conductivity value for the depth of the formation by applying an inversion scheme on the at least one analytical model that includes the one or more parameters and the admittance value.

10. The method of claim 9, wherein the inversion scheme comprises a bisection algorithm.

11. A system for evaluating formation conductivity, the system comprising
    at least one processor coupled to at least one focused electrode device, wherein:
    the at least one processor is configured to obtain at least one analytical model of admittance of a formation as a function of conductivity of the formation;

the at least one focused electrode device is configured to generate a plurality of samples for the admittance of the formation;

the at least one processor is further configured to determine one or more parameters of the at least one analytical model based on the plurality of samples and the at least one model;

the at least one focused electrode device is further configured to measure admittance of the formation; and the at least one processor is further configured to calculate conductivity of the formation from the measured admittance based on the at least one analytical model with the one or more parameters.

12. The system of claim 11, wherein the at least one analytical model of admittance comprises at least one of: a model for magnitude of admittance, or another model for a real part of admittance.

13. The system of claim 11, wherein the at least one focused electrode device is further configured to:

measure the plurality of samples for the admittance of the formation for different conductivity values of the formation.

14. The system of claim 11, wherein the at least one focused electrode device comprises at least one azimuthal focused resistivity (AFR) tool configured for measuring admittance values for different depths of the formation.

15. The system of claim 11, wherein for each sample of the plurality of samples:

the at least one focused electrode device is further configured to apply a voltage and measure a resulting electrical current for the applied voltage; and the at least one processor is further configured to calculate that sample as a ratio of the resulting electrical current and the applied voltage.

16. The system of claim 11, wherein the at least one processor is further configured to:

minimize an error between the plurality of samples for the admittance and values of the admittance based on the at least one analytical model to determine the one or more parameters.

17. The system of claim 11, wherein:

the at least one focused electrode device is further configured to measure, for a depth of the formation, an electrical current resulting from an applied voltage; and the at least one processor is further configured to calculate a admittance value for the depth as a ratio of the measured electrical current and the applied voltage.

18. The system of claim 17, wherein the at least one processor is further configured to:

calculate a conductivity value for the depth of the formation by applying an inversion scheme on the at least one analytical model that includes the one or more parameters and the admittance value.

19. The system of claim 11, further comprising a downhole tool interfaced with the at least one processor and the at least one focused electrode device, the downhole tool is configured to perform a downhole operation based on the calculated conductivity of the formation.

* * * * *